United States Patent [19]

Dobson

[11] 4,212,339
[45] Jul. 15, 1980

[54] TIRE/WHEEL ASSEMBLY WITH LOW MOLECULAR WEIGHT COOLANT-LUBRICANT

[75] Inventor: Robert L. Dobson, Tallmadge, Ohio

[73] Assignee: The Goodyear Tire & Rubber Company, Akron, Ohio

[21] Appl. No.: 216

[22] Filed: Jan. 2, 1979

[51] Int. Cl.$^2$ .................... B60C 17/04; B60C 19/06
[52] U.S. Cl. ..................... 152/158; 152/330 RF; 152/330 L; 152/330 C
[58] Field of Search ........ 152/330 RF, 330 L, 330 C, 152/152, 153, 158, 346, 347; 252/49.3, 52 A

[56] References Cited

U.S. PATENT DOCUMENTS

| 3,000,826 | 9/1961 | Gililland | 252/49.3 |
|---|---|---|---|
| 3,739,829 | 6/1973 | Powell et al. | 152/330 RF |
| 3,850,217 | 11/1974 | Edwards et al. | 152/158 X |
| 3,990,492 | 11/1976 | Hyndman et al. | 152/158 |
| 4,036,765 | 7/1977 | Conger et al. | 152/330 L X |
| 4,051,884 | 11/1977 | Bourne et al. | 152/330 RF X |

FOREIGN PATENT DOCUMENTS

| 2706212 | 8/1977 | Fed. Rep. of Germany . |
|---|---|---|
| 1443929 | 7/1976 | United Kingdom . |
| 1444347 | 7/1976 | United Kingdom . |

*Primary Examiner*—John T. Goolkasian
*Assistant Examiner*—Lois E. Rodgers
*Attorney, Agent, or Firm*—H. C. Young, Jr.

[57] ABSTRACT

A tire/wheel assembly comprised of (A) a pneumatic tire axially mounted on a centered, wheeled rim, said assembly having attached therein a receptacle containing a coolant composition comprised of water and a low molecular weight polyethylene glycol, and (B) means for releasing said coolant composition onto the inner surface of said pneumatic tire. The invention has a particular purpose of inhibiting or retarding a rapid rate and temperature build-up caused by pneumatic tire being at least partially inflated primarily due to a reduction in its inflation pressure.

10 Claims, 4 Drawing Figures

TIRE/WHEEL ASSEMBLY WITH LOW MOLECULAR WEIGHT COOLANT-LUBRICANT

TECHNICAL FIELD

This invention relates to pneumatic tire/wheel assemblies. The invention particularly relates to such assemblies containing a low viscosity fluid coolant composition particularly applicable when the tire loses a substantial amount of its normal inflation pressure.

BACKGROUND ART

A pneumatic tire which can effectively run flat under load after losing its inflation pressure, for a satisfactory distance at relatively low speeds, has long been sought after. When a conventional pneumatic tire is run in its flat condition, a rapid heat build-up occurs from both internal friction and, normally, internal surface-to-surface contact, resulting in a destruction of part of the tire generally through a chemical breakdown of its components and consequent failure. Lubrication of the tire's inner surface has been the primary proposed solution to retard the heat build-up. Indeed, the technical art shows numerous applications of lubricants for reducing the heat-inducing friction of surface-to-surface contact of the inner surfaces of the collapsed tire. For this purpose, various lubricants have been proposed and/or used which include, for example, (1) solid compositions which will flow at elevated temperatures, (2) a liquid poly(oxyalkylene) glycol and a gelling agent therefor to prevent it from being normally free-flowing and (3) mixtures of various volatile liquids, including water, with lubricating materials such as high molecular weight poly(oxyalkylene) glycol. Although some references teach that some cooling effect is present, the primary thrust is lubrication.

Solid coatings which would only flow under higher temperatures experienced with the running of collapsed tires may be ineffective lubricants by not becoming fluid fast enough to lubricate and save the deflated tire.

Liquid lubricant coatings would appear to be most satisfactory. However, they can be a disadvantage since they would normally have to flow under normal tire operating conditions over a wide temperature range yet still be sufficiently viscous to be effective as a lubricant.

Water has been taught to be useful as a rubber-to-rubber interfacing lubricant but, by itself, is hardly an all-season lubricant, particularly because of its freezing point. Mixtures of water and ethylene glycol, as an antifreeze, have been proposed for this purpose. Mixtures of water and high molecular weight polyethylene glycol have also been proposed with the mixture having a sufficiently high viscosity to be effective as a lubricant and where the water itself could provide some cooling effect with even a possibility of some inflation benefit if it were to vaporize. These systems have not been entirely satisfactory.

For illustrative examples of such prior technical art, reference is made to the following U.S. Pat. Nos.: 4,051,884; 3,739,829; 3,850,217; 4,036,765; British Pat. Nos: 1,443,929 and 1,444,347 and German DAS No. 2706-212.

Indeed, in view of these various problems associated with lubricant application to interior surfaces of tires for the purpose of retarding their breakdown upon going flat, it is still desired to provide an effective means for inhibiting rapid heat build up. A primary difficulty relates to inhibiting, or preventing as long as possible, heat build up, and an accompanying temperature rise, due to internal stresses within the tire carcass itself. It is considered that such internal stresses between the components of the tire are a major source of rapid heat build-up in a collapsed tire being run under load leading to its early failure and that friction due to surface-to-surface contact is a more minor source of rapid heat build-up.

Therefore, it is an object of this invention to provide a tire/wheel assembly which contains a coolant for retarding rapid heat build-up due to at least a partial collapse of the tire while being run under a load.

DISCLOSURE AND PRACTICE OF INVENTION

In accordance with this invention, a tire/wheel assembly is provided which is comprised of (A) a pneumatic tire axially mounted on a centered, rigid wheel rim, said assembly having attached therein a receptacle containing a coolant composition separate from the inner surface of the tire comprised of about 40 to about 70, preferably about 50 to about 60, weight percent water and correspondingly, about 60 to about 30, preferably about 50 to about 40, weight percent polyethylene glycol having a number average molecular weight in the range of about 300 to about 600, preferably about 350 to about 550, said coolant composition itself characterized by having a viscosity in the range of about 4 to about 30 centipoises at about 25° C., measured with a Brookfield LVF viscometer with spindle No. 1 at 12 rpm, and (B) means for releasing said coolant composition onto the inner surface of said pneumatic tire as a coating thereon to conduct heat from the inner surface of said tire in its at least partially deflated state and thereby retard a rapid heat build-up to a destructive temperature range in the tire carcass.

Although the invention is not completely understood, the beneficial cooling is apparently a combination or balance between the liquid/solid interface and viscosity gradient within the liquid coolant. The interfacing liquid-to-solid phenomenon is important to carry away the heat as it tends to build up. Apparently the correct balance between polyethylene glycol molecular weight, ratio of water to polyethylene glycol, and the viscosity of the mixture is important for the cooling benefit.

Otherwise, without this balance of properties, the effect would primarily be lubrication which would reduce the heat build-up due to rubber-to-rubber contact but would do little to retard internally generated heat build-up.

In the practice of this invention, a conventional pneumatic tire/wheel assembly comprises (A) a tire having, as its basic structure, two spaced, relatively inextensible, beads, a ground contacting tread portion, a pair of individual sidewalls extending radially inward from the axial outer edges of said tread portion to join the respective beads, a supporting carcass structure for the tread portion and sidewalls, usually extending from bead to bead, (B) optionally, a rigid support member circumferentially attached to said wheel and extending outwardly into the cavity of said pneumatic tire without contacting the inner surface of the tire in its normal inflated state and positioned to prevent the tire from going flat at low inflation pressures by making contact with the inner surface of said tire when it is partially collapsed, (C) the fluid coolant of this invention and a containing means and releasing means therefor attached to said wheel or said support member adapted to contain the coolant separate from the tire and release it as a coating on the inner surface of the tire and, if the optional rigid support is used, to form an interfacing fluid layer between said rigid support and the inner surface of said tire, thereby retarding a rapid tire temperature increase resulting from rotationally running the tire/wheel assembly under load with an inflation pressure of less than 50 percent of it standard pressure and a consequent at least partial collapse of the tire.

The coolant is particularly desirable effective to inhibit the rapid heat and temperature increase upon at least a 50 percent collapse of the tire when it is being rotationally run at less than about 50 percent of its standard inflation pressure and at a rotational speed equivalent to at least a 5, preferably at least a 40, miles per hour (mph) vehicular speed.

The tire's standard pressure is a value normally established for the tire's particular construction and size, maximum load and, possibly, its intended use, by an independent, accepted, agency or by the tire manufacturer. Generally accepted standards are found in The Yearbook published annually by The Tire And Rim Association, Inc., 3200 West Market Street, Akron, Ohio.

In order to facilitate this invention and to provide an effective water/polyethylene glycol coolant mixture, it is required that the polyethylene glycol be of a very low molecular weight. In this regard, the low molecular weight polyethylene glycol is characterized by having a molecular weight in the range of about 300 to about 600, and a consequential viscosity at 25° C. in the range of about 50 to about 200 centipoises (cps), measured with a Brookfield LVF viscometer using spindle No. 1 at 12 rpm.

The weight ratio of water to polyethylene glycol for the purpose of this invention is in the range of about 40/60 to about 70/30, preferably about 50/50 to about 60/40.

Accordingly, the water/low molecular weight polyethylene glycol mixture itself is characterized by having a low viscosity in the range of about 4 to about 30 cps at 25° C. as measured with a Brookfield LVF viscometer using spindle No. 1 at 12 rpm.

Although it has been earlier disclosed to use polyethylene glycol as a lubricant in combination with water, with higher viscosity being urged for lubricity enhancement, such a combination is not considered to have contemplated the applicants' low viscosity composite coolant of water and low molecular weight polyethylene glycol with its discovered interfacing-coolant effect feature in a rotationally running tire/wheel assembly under load.

As hereinbefore pointed out, in the practice of this invention, the primary inventive feature involves the cooling effect of the liquid water/polyethylene glycol mixture. This is based upon the premise that the primary source of heat build-up is caused by internal stresses within the tire carcass of its individual elements, including rubber, fabric, belts and tread portions. The heat build-up caused by such internal stresses ultimately, apparently, cause a chemical breakdown, loss of adhesion and strength between the various elements and the ultimate failure and deformation.

Typically, a normal passenger tire may operate under load on a vehicle at a temperature in the range of about 66° C. Upon deflation, particularly resulting from a puncture, the tire carcass may quickly reach the temperature in the region of 132° C. through internal stresses as a primary heat build-up source and through surface-to-surface friction. This results in a fairly high rate of destruction of the tire. The subject of this invention retards this heat or temperature build up rate.

Most lubricants, it has been found, simply are ineffective as heat transfer agents for removing the heat caused by the internal stresses. At most, they lubricate the rubber surface to reduce friction. In most, if not virtually all cases, the lubricants are either relatively ineffective as heat transfer agents and/or do not become fluid quickly enough to act as a coolant in the sense of this invention.

DESCRIPTION OF DRAWINGS

For a better understanding of this invention, reference is made to the drawings as follows.

Figure 1:
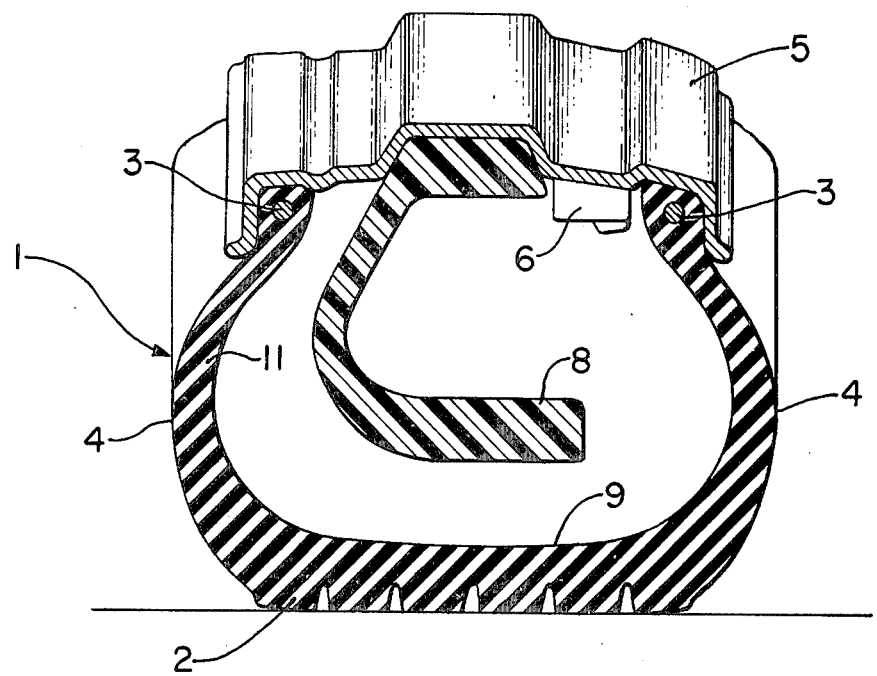
FIG. 1 is a cross-sectional elevational fragmentary view of a cut-away portion of a tire mounted on a rim in its inflated state and, optionally, containing a rigid stabilizer attached to the rim.

More specifically, and with reference to the drawings, it is seen that a pneumatic tire 1 is provided having a customary tread portion 2, spaced beads 3, and sidewall 4 connecting the tread and beads, where the tire is mounted on a rim 5 and having an attached container 6, containing the fluid composition of this invention 7.

The tire/wheel assembly may also have a rigid stabilizer 8 attached to the rim with its purpose being to provide a support to prevent the tire from going flat.

Figure 3:
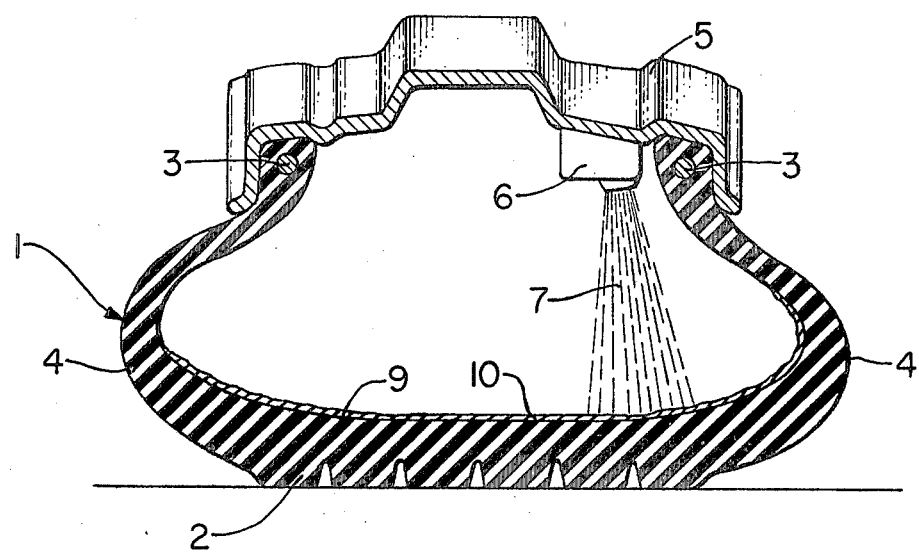
FIG. 3 is the tire/wheel assembly of FIG. 1 in its partially deflated state upon being punctured, without the optional stabilizer.

If the tire 1 is punctured, it may collapse to the extent that its inner surface 9 may come into contact with the stabilizer 8. Actually the tire may deflate or collapse to varying degrees as shown in FIGS. 3 and 4.

Figure 4:
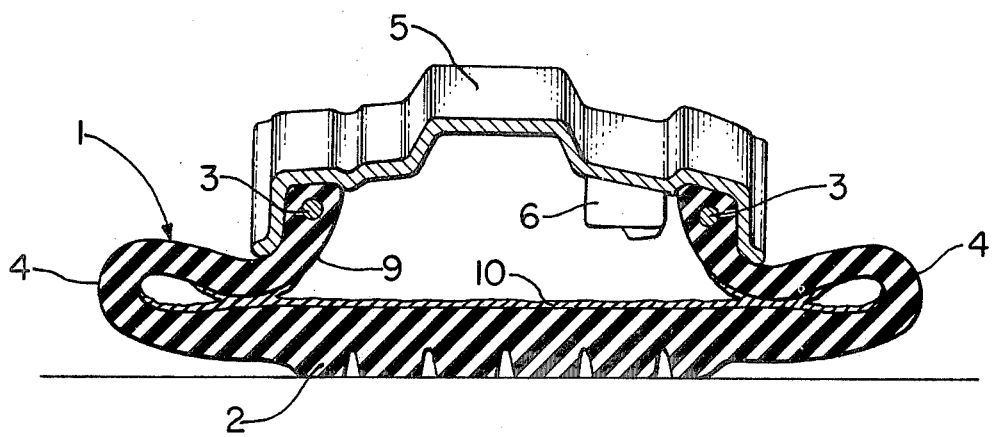
FIG. 4 is the tire/wheel assembly of FIG. 3 collapsed to the extent that there is surface-to-surface contact between the inner surfaces of its sidewall.

Thus, a typical passenger tire, upon being deflated, may ultimately go flat to the extent that there is actual surface-to-surface contact of its inner surfaces as shown in FIG. 4.

In the practice of this invention, upon experiencing a deflation, particularly due to puncturing, the liquid coolant of this invention 7 is released from its container 6 to provide a coating 10 on the inner surface of the tire. The coating has a coolant affect by carrying away heat generated by the internal stresses placed upon the carcass elements of the tire and, where applicable, by also carrying away heat as well as providing some lubricity between surface-to-surface contact areas.

The amount of coolant composition utilized can vary over a relatively wide limit depending primarily upon the size of the pneumatic tire itself. For example, in a tire of the size and type HR 70×15, generally about 0.3 to about 0.8 liters is generally satisfactory. However, the desired amount will vary from tire to tire depending somewhat upon the tire size, its internal volume, its tread area and its intended use. Generally, it is desired that the fluid coating of the coolant composition has a thickness in the range of about 0.1 to about 2 millimeters.

Application of the coolant composition onto the inner surface of the pneumatic tire can be accomplished by (A) directly coating the inner surface with the coolant composition, (B) injecting the composition into the tire cavity when the tire is fitted onto the rim, or (C) providing a container for the lubricant composition which is released by an activation means by the deflation of the tire to coat the fluid coolant composition onto the tire's inner surface. This invention relates to application (C).

The practice of this invention is further illustrated by reference to the following examples which are intended to be representative rather than restrictive of the scope of the invention. Unless otherwise indicated, all parts and percentages are by weight.

EXAMPLE I

Radial passenger tires of type and size HR 70×15 were made and mounted on rims. The rims had been provided with a stabilizer in a manner shown in FIG. 1. About 0.57 liter of liquid coolant composition or lubricant was added to each tire, except the control, through its valve stem. The control contained none of the coolant composition.

Figure 2:
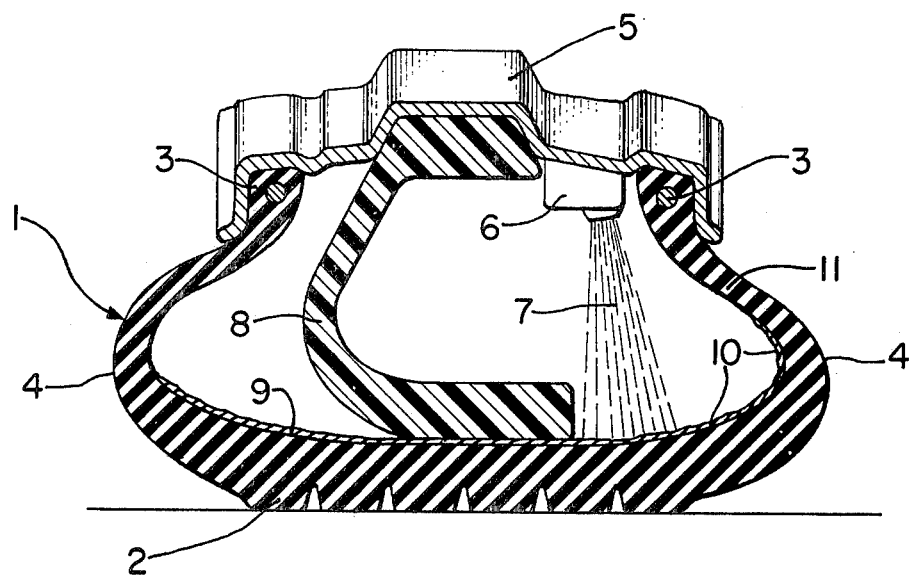
FIG. 2 is the inflated tire/wheel assembly of FIG. 1 upon being deflated to the extent that its inner surface opposite its tread is in contact with said stabilizer, if it were optionally used.

Each of the tire/wheel assemblies was run in a deflated condition similar to FIG. 2 against a dynometer at an effective vehicular speed of 50 miles per hour (mph) under a load of 1280 pounds. The results are shown in the following Table 1. After mounting and inflating the tires, the valve cores were removed to insure that the tires deflated with zero internal pressure, thus simulating worst conditions.

TABLE 1

| | Coolant or Lubricant | Miles To Failure |
|---|---|---|
| 1. | None | 6.7 |
| 2. | Molybdenum disulfide | 13.2 |
| 3. | Silicone grease + graphite | 18.0 |
| 4. | Silicone grease, high temperature | 37.0 |
| 5. | Water | 44.0 |
| 6. | Water & 400 molecular weight polyethylene glycol* | no failure at 50 miles, test discontinued |

*50/50 weight ratio water/polyethylene glycol; viscosities at 25° C. measured with Brookfield LVF viscometer with spindle No. 1 at 12 RPM for the mixture and for polyethylene glycol were 10 and 100 cps, respectively.

EXAMPLE II

Additional HR 70×15 tires were obtained and tested to compare with a control tire (1) water/ethylene glycol and water/polyethylene glycol mixture of this invention and (2) the effect of various amounts of water/polyethylene glycol mixture of this invention as in FIG. 1.

The deflated tires were run on, or against, a dynometer, under load, as in Example I and the distance noted at which the tire was considered as failed and the tire temperature measured by a probe into its tread portion. The tire failures were judged to have been the result of the heat build-up causing an internal breakdown, as evidenced by delaminations, separations and the like.

The test results are shown in the following Table 2:

After mounting and inflating the tires, the valve cores were removed to insure that the tires deflated with zero internal pressure, thus simulating worst conditions.

Table 2

| | Coolant Composition[1] | Quantity (grms) | Tire Carcass[2] Temp (°C.) | Miles[3] (km) | Tire Failure |
|---|---|---|---|---|---|
| 1. | None | — | 121° C. | 6.7 (10.8) | Yes |
| 2. | Water/ethylene glycol | 232 | 129° C. | 40 (64.4) | Yes |
| 3. | Water/polyethylene glycol[4] | 58 | 154° C. | 27 (43.4) | Yes |
| 4. | Water/polyethylene glycol[4] | 141 | 107° C. | 50 (80.5) | No |
| 5. | Water/polyethylene glycol[4] | 232 | 104° C. | 50 (80.5) | No |
| 6. | Water/polyethylene glycol[4] | 464 | 110° C. | 50 (80.5) | No |

[1]Water/compound weight ratio = 45/55
[2]Taken by test probe through a center rib of tread at end of test
[3]Test was only run for 50 miles
[4]Polyethylene glycol reported molecular weight was 400

The test results show that the utilization of about ½ pint (about 0.23 liters) of the coolant composition of this invention (composition No. 5 in Table 2) was considerably more effective in retarding the ordinarily fast heat rise to tire carcass degradation temperatures with the deflated tire being run under load.

Note that the tire with no coolant only ran 6.7 miles (10.8 km) to failure with a final carcass temperature of 121° C. and the tire with the water/monomeric ethylene glycol mixture only ran 40 miles (64.4 km) to failure with a final carcass temperature of 129° C.

The final experimental results shown in Table 2 (Nos. 4–6) demonstrate that a minimal amount of the composition of this invention is desirable.

EXAMPLE III

Additional HR 70×15 tires were obtained and tested in their deflated condition (as in Examples I and II, except that one quart (0.95 liter) of liquid was used) against a dynometer, under load and the distance at failure shown as well as final carcass and cavity temperatures.

The fluids tested were water, water/ethylene glycol, the water/polyethylene glycol composition of this invention and water/polypropylene glycol. The results are shown in the following Table 3. After mounting and inflating the tires, the valve cores were removed to insure that the tires deflated with zero internal pressure, thus simulating worst conditions similar to FIG. 2.

It is important to appreciate that the obtained results shown in Table 3 apparently indicate that the water/polyethylene glycol composite was substantially special to the water/polypropylene glycol composite. This was particularly evident when using the 400 molecular weight polymers.

Table 3

| Coolant Composition (Weight Ratio) | Cavity Temperature (°C.) Minutes: 15 | 30 | 45 | 60 | Tire Failure | Miles (km) | Carcass Temp °C. |
|---|---|---|---|---|---|---|---|
| 1. water | 101 | 100 | 123 | — | Yes | 38 (61) | 135 |
| 2. water/ethylene glycol (55/45) | 109 | 125 | 133 | 146 | Yes | 100 (161) | 118 |

Table 3-continued

| Coolant Composition (Weight Ratio) | Cavity Temperature (°C.) Minutes: 15 | 30 | 45 | 60 | Tire Failure | Miles (km) | Carcass Temp °C. |
|---|---|---|---|---|---|---|---|
| 3. water/polypropylene glycol (62/38)[1] | 96 | 98 | 97 | — | Yes | 43 (70) | 116 |
| 4. water/polypropylene glycol (62/38)[2] | 96 | 95 | 90 | 96 | Yes | 83 (134) | — |
| 5. water/polypropylene glycol (49/51)[3] | 96 | 95 | 90 | 96 | Yes | 83 (134) | 132 |
| 6. water/polyethylene glycol (55/45)[4] | 100 | 111 | 119 | 125 | No | 100 (161) | 117 |

[1]polypropylene glycol with reported 410 molecular weight
[2]polypropylene glycol with reported 1300 molecular weight
[3]polypropylene glycol with reported 2000 molecular weight
[4]polyethylene glycol with reported 410 molecular weight

EXAMPLE IV

For viscosity comparative purposes, viscosities were measured for polyethylene glycol with reported molecular weights ranging from 200 to 600 and for mixtures thereof with water at various temperatures. The results are shown in the following Table 4:

Table 4

| Experiment Number | Polyethylene glycol molecular weight | Viscosity (cps)[1] 21° C. | 38° C. | 85° C. | 93° C. |
|---|---|---|---|---|---|
| 1 | 200 | 8.0 | 9.2 | 3.8 | 3.4 |
| 2 | 300 | 8.0 | 6.0 | 3.2 | 2.8 |
| 3 | 400 | 15.2 | 10.0 | 4.4 | 4.0 |
| 4 | 600 | 14.4 | 9.0 | 3.8 | 3.6 |
| Mixture of 55/45 water/polyethylene glycol[2] | | | | | |
| 5 | 200 | 4.2 | 3.4 | 2.8 | 2.6 |
| 6 | 300 | 3.8 | 3.2 | 2.8 | 2.6 |
| 7 | 400 | 4.8 | 3.4 | 3.2 | 2.8 |
| 8 | 600 | 4.4 | 3.4 | 2.8 | 2.6 |

[1]The viscosities were measured with a Brookfield LVF-1 viscometer with spindle No. 1 at 30 RPM
[2]water/polyethylene glycol weight ratio While certain representative embodiments and details have been shown for the purpose of illustrating the invention, it will be apparent to those skilled in this art that various changes and modifications may be made therein without departing from the spirit or scope of the invention.

I claim:

1. A tire/wheel assembly comprised of:
    (A) a pneumatic tire axially mounted on a centered, rigid wheel rim, said assembly having attached therein a receptacle containing a coolant composition comprised of about 40 to about 70 weight percent water and correspondingly about 60 to about 30 weight percent polyethylene glycol having a number average molecular weight in the range of about 300 to about 600, said coolant composition itself characterized by having a viscosity in the range of about 4 to about 30 centipoises at about 25° C., measured with a Brookfield LVF viscometer with spindle No. 1 at 12 rpm, and
    (B) means for releasing said coolant composition onto the inner surface of said pneumatic tire as a coating thereon to conduct heat from the inner surface of said tire in its at least partially deflated state and thereby retard a rapid heat build-up to a destructive temperature range in the tire carcass.

2. The tire/wheel assembly of claim 1 which comprises (A) a tire having, as its basic structure, two spaced, relatively inextensible, beads, a ground contacting tread portion, a pair of individual sidewalls extending radially inward from the axial outer edges of said tread portion to join the respective beads, a supporting carcass structure for the tread portion and sidewalls, usually extending from bead to bead. (B) the fluid coolant of this invention and a containing means and releasing means therefor attached to said wheel adapted to contain the coolant separate from the tire and release it as a coating on the inner surface of the tire, thereby retarding a rapid tire temperature increase resulting from rotationally running the tire/wheel assembly under load with an inflation pressure of less than 50 percent of its standard pressure and a consequent at least partial collapse of the tire.

3. The tire/wheel assembly of claim 2 where the coolant composition is released to provide a coating on the inner surface of the tire when said tire is being run at an inflation pressure of less than 50 percent of its standard pressure and at a rotational speed equivalent to at least a 5 mile per hour vehicular speed.

4. The tire/wheel assembly of claim 1 where, in said coolant composition, the weight ratio of water to polyethylene glycol is in the range of about 50/50 to about 60/40 and said polyethylene glycol is characterized by having a molecular weight in the range of about 300 to about 600, and a consequential viscosity at 25° C. in the range of about 50 to about 200 centipoises (cps), measured with a Brookfield LVF viscometer using spindle No. 1 at 12 rpm.

5. The tire/wheel assembly of claim 2 where, in said coolant composition, the weight ratio of water to polyethylene glycol is in the range of about 50/50 to about 60/40 and said polyethylene glycol is characterized by by having a molecular weight in the range of about 300 to about 600, and a consequential viscosity at 25° C. in the range of about 50 to about 200 centipoises (cps), measured with a Brookfield LVF viscometer using spindle No. 1 at 12 rpm, where the amount of coolant composition, upon being released, is sufficient to provide a fluid coating thereof on the inner surface of the tire of a thickness in the range of about 0.1 to about 2 millimeters to inhibit a rapid rate of heat and temperature increase of the tire upon at least a 50 percent collapse of the tire and at a rotational speed equivalent to at least a 5 mile per hour vehicular speed.

6. The tire/wheel assembly of claim 2 where said containing means adaptably contains a sufficient amount of said coolant composition, upon being released, to inhibit or retard rapid heat and temperature increase of the tire at its rotational speed equivalent to at least a 40 mph vehicular speed.

7. The tire/wheel assembly of claim 1 which comprises (A) a tire having, as its basic structure, two spaced, relatively inextensible, beads, a ground contacting tread portion, a pair of individual sidewalls extending radially inward from the axial outer edges of said tread portion to join the respective beads, a supporting carcass structure for the tread portion and sidewalls, usually extending from bead to bead, (B) a rigid support member circumferentially attached to said wheel and extending outwardly into the cavity of said pneumatic tire without contacting the inner surface of the tire in its normal inflated state and positioned to prevent the tire from going flat at low inflation pressures by making contact with the inner surface of said tire when it is partially collapsed, (C) the fluid coolant of this invention and a containing means and releasing means therefor attached to said support member adapted to contain the coolant separate from the tire and release it as a coating on the inner surface of the tire and to form an interfacing fluid layer between said rigid support and the inner surface of said tire, thereby retarding a rapid tire temperature increase resulting from rotationally running the tire/wheel assembly under load with an inflation pressure of less than 50 percent of its standard pressure and a consequent at least partial collapse of the tire.

8. The tire/wheel assembly of claim 7 where the coolant composition is released to provide a coating on the inner surface of the tire when said tire is being run at an inflation pressure of less than 50 percent of its standard pressure and at a rotational speed equivalent to at least a 5 mile per hour vehicular speed.

9. The tire/wheel assembly of claim 7 where, in said coolant composition, the weight ratio of water to polyethylene glycol is in the range of about 50/50 to about 60/40 and said polyethylene glycol is characterized by having a molecular weight in the range of about 300 to about 600, and a consequential viscosity at 25° C. in the range of about 50 to about 200 centipoises (cps), measured with a Brookfield LVF viscometer using spindle No. 1 at 12 rpm, where the amount of coolant composition, upon being released, is sufficient to provide a fluid coating thereof on the inner surface of the tire of a thickness in the range of about 0.1 to about 2 millimeters to inhibit a rapid rate of heat and temperature increase of the tire upon at least a 50 percent collapse of the tire and at a rotational speed equivalent to at least a 5 mile per hour vehicular speed.

10. The tire/wheel assembly of claim 7 where said containing means adaptably contains a sufficient amount of said coolant composition, upon being released, to inhibit or retard rapid heat and temperature increase of the tire at its rotational speed equivalent to at least a 40 mph vehicular speed.

* * * * *